(12) United States Patent
Chen et al.

(10) Patent No.: US 8,259,235 B2
(45) Date of Patent: Sep. 4, 2012

(54) IMAGE PROCESSING APPARATUS AND METHOD THEREOF

(75) Inventors: Mei-Ju Chen, Hsinchu Hsien (TW); Jen-Shi Wu, Hsinchu Hsien (TW); Wei-Kuo Lee, Hsinchu Hsien (TW)

(73) Assignee: MStar Semiconductor, Inc. (TW)

( * ) Notice: Subject to any disclaimer, the term of this patent is extended or adjusted under 35 U.S.C. 154(b) by 309 days.

(21) Appl. No.: 12/794,950

(22) Filed: Jun. 7, 2010

(65) Prior Publication Data

US 2011/0001880 A1    Jan. 6, 2011

(30) Foreign Application Priority Data

Jul. 2, 2009   (TW) .............................. 98122412 A (51) Int. Cl.
*H04N 5/21* (2006.01)
(52) U.S. Cl. ...................................................... 348/631
(58) Field of Classification Search .................. 348/625, 348/631, 441, 448, 450–452, 458, 459, 712; 382/255, 266, 162
See application file for complete search history.

(56) References Cited

U.S. PATENT DOCUMENTS

| | | | | |
|---|---|---|---|---|
| 5,418,574 A | * | 5/1995 | Miyabata et al. | 348/625 |
| 5,479,216 A | * | 12/1995 | Reime | 348/631 |
| 5,729,360 A | * | 3/1998 | Kita et al. | 358/500 |
| 5,920,357 A | * | 7/1999 | Ohara | 348/625 |
| 6,600,517 B1 | * | 7/2003 | He et al. | 348/625 |
| 6,822,680 B1 | * | 11/2004 | Kanda | 348/273 |
| 7,319,496 B2 | * | 1/2008 | Uchida et al. | 348/625 |
| 7,738,044 B2 | * | 6/2010 | Arici et al. | 348/631 |
| 7,916,937 B2 | * | 3/2011 | Utsugi et al. | 382/162 |
| 2003/0107678 A1 | * | 6/2003 | Lin et al. | 348/630 |
| 2005/0168644 A1 | * | 8/2005 | Demas et al. | 348/630 |
| 2008/0012968 A1 | * | 1/2008 | Lim et al. | 348/252 |
| 2008/0284916 A1 | * | 11/2008 | Ikeda | 348/712 |
| 2010/0189374 A1 | * | 7/2010 | Tsukioka | 382/266 |
| 2011/0116726 A1 | * | 5/2011 | Hosaka et al. | 382/255 |

* cited by examiner

*Primary Examiner* — Paulos Natnael
(74) *Attorney, Agent, or Firm* — Han IP Law PLLC; Andy M. Han (57) ABSTRACT

An image processing apparatus includes an image decoding unit and an image adjusting unit. The image decoding unit decodes a data stream to generate a first image comprising a first pixel. The image adjusting unit comprises a pixel edge determining module and a chrominance adjusting module. The pixel edge determining module determines an edge luminance parameter according to an initial luminance value of the first pixel and a plurality of initial luminance values of pixels neighboring the first pixel, and determines an edge chrominance parameter according to an initial chrominance value of the first pixel and a plurality of initial chrominance values of pixels neighboring the first pixel. The first chrominance adjusting module determines a first weight according to the edge luminance parameter and the edge chrominance parameter, and generates a first adjusted chrominance value by weighted calculating a first predetermined chrominance value and the initial chrominance value of the first pixel.

17 Claims, 10 Drawing Sheets

F0_even: P11 P12 P13 P14 P15 / P21 P22 P23 P24 P25 / P31 P32 P33 P34 P35

F0_odd

F1_even: P11 P12 P13 P14 P15 / P21 P22 P23 P24 P25 / P31 P32 P33 P34 P35

F1_odd

IMAGE PROCESSING APPARATUS AND METHOD THEREOF

CROSS REFERENCE TO RELATED PATENT APPLICATIONS

This patent application claims priority from Taiwan Patent Application No. 098122412, filed in the Taiwan Patent Office on Jul. 2, 2009, entitled "Image Processing Apparatus and Method Thereof", and incorporates the Taiwan patent application in its entirety by reference.

TECHNICAL FIELD

The present disclosure relates to an image processing apparatus, and more particularly, to an image processing apparatus and a method thereof capable of adjusting a chrominance of an image according to edges, motions, degrees of variation, or saturation of the image.

BACKGROUND OF THE PRESENT DISCLOSURE

Figure 1:
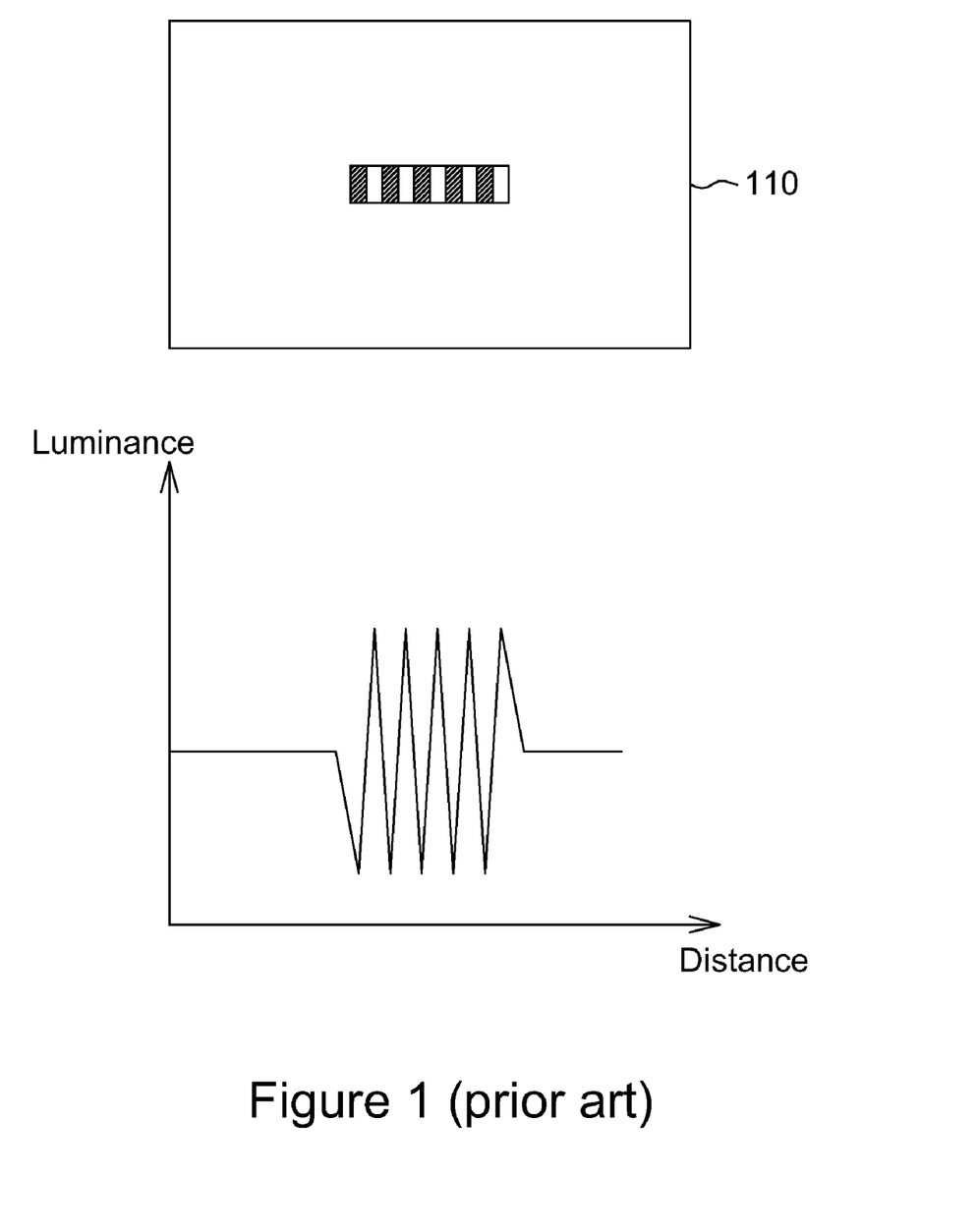
FIG. 1 is a schematic diagram of high frequency luminance in spatial domain of a partial image data.

In a conventional television (TV) system, a TV signal comprises a luminance component and a chrominance component. Upon receiving the TV signal, the TV system separates the luminance component and the chrominance component (i.e., a Y/C separation) via a filter. However, when a part of an image frame 110 in FIG. 1 comprises high frequency luminance in the spatial domain (i.e., the luminance varies very frequently in spatial domain), luminance and chrominance data of a partial TV signal cannot be accurately restored, e.g., the high frequency luminance components may be treated as chrominance components to result in rainbow-like chrominance on the image frame. The rainbow-like chrominance is also referred to as a cross-color phenomenon that causes defects on the image frame.

When cross-color occurs, for a pixel at a position on consecutive static frames, chrominance values of the pixel at the same position of two associated frames (e.g., two frames of a two-frame interval in a National Television System Committee (NTSC) system, or two frames of a four-frame interval in a Phase Alternation Line (PAL) system) are respectively $C+^{\Delta}C$ and $C-^{\Delta}C$, where C is an ideal chrominance value of the pixel at the position, $^{\Delta}C$ is a chrominance deviation caused by the high frequency luminance. Therefore, in order to overcome the issue of cross-color, an average chrominance value of the pixel at the same position of the two associated frames is calculated, and the calculated average chrominance value is regarded as the chrominance value of the pixel at the same position of the two associated frames. However, the foregoing method for overcoming the issue of cross-color is only suitable for consecutive static frame. More specifically, when a moving object contains high frequency luminance in spatial domain of an image frame, not only does the foregoing method not overcome the issue of cross-color, but a greater error in chrominance of the image frame may also result.

SUMMARY OF THE PRESENT DISCLOSURE

Therefore, one object of the present is to provide an image processing apparatus and an image processing method to compensate a chrominance of an image according to a degree of motion, thereby solving the foregoing problem.

According to an embodiment of the present disclosure, an image processing apparatus comprises an image decoding unit and an image adjusting unit. The image decoding unit, for decoding a data stream to generate a first image comprising a first pixel. The image adjusting unit comprises a pixel edge determining module and a chrominance adjusting module. The pixel edge determining module determines an edge luminance parameter according to an initial luminance value of the first pixel and a plurality of initial luminance values of pixels neighboring the first pixel, and determines an edge chrominance parameter according to an initial chrominance value of the first pixel and a plurality of initial chrominance values of pixels neighboring the first pixel. The first chrominance adjusting module determines a first weight according to the edge luminance parameter and the edge chrominance parameter, and generates a first adjusted chrominance value by weighted calculating a first predetermined chrominance value and the initial chrominance value of the first pixel.

According to another embodiment of the present disclosure, an image processing apparatus decodes a data stream to generate a first image and a second image, the first image and the second image respectively having a first pixel and a second pixel at the same position. The edge determining module determines an edge luminance parameter according to an initial luminance value of the first pixel and a plurality of pixels neighboring the first pixel, and determines an edge chrominance parameter according to an initial chrominance value of the first pixel and a plurality of initial chrominance values of pixels neighboring the first pixel. The pixel motion determining module calculates a luminance difference between the initial luminance value of the first pixel and an initial luminance value of the second pixel and a chrominance difference between the chrominance value of the first pixel and a chrominance value of the second pixel. The saturation determining module determines a saturation parameter according to a difference between the first pixel and a first predetermined chrominance value. The chrominance adjusting module determines a weight according to the edge luminance parameter, the edge chrominance parameter, the luminance difference, the chrominance difference and the saturation parameter, and generates an adjusted chrominance value of the first pixel by weighted calculating a second predetermined chrominance value and the initial chrominance value of the first pixel according to the weight.

According to another embodiment of the present disclosure, an image processing method comprises decoding a data stream to generate a first image comprising a first pixel; determining an edge luminance parameter according to an initial luminance value of a first pixel and a plurality initial luminance values of pixels neighboring the first pixel; determining an edge chrominance parameter according to an initial chrominance value of the first pixel and a plurality of initial chrominance values of pixels neighboring the first pixel; determining a first weight according to the edge luminance parameter and the edge chrominance parameter; and generating a first adjusted chrominance value by weighted calculating a first predetermined chrominance value and the initial chrominance value of the first pixel according to the first weight.

According to an image processing apparatus and an image processing method provided by the present disclosure, an adjusted chrominance value of a pixel at a target position of an edge of a motion object is determined according to a first predetermined chrominance value and an initial chrominance value of the pixel at the target position, i.e., saturation of an area within which cross-color occurs in an image is reduced. Thus, while image quality is improved, visual discomfort caused by over-brightness and high saturation in the area with cross-color is also avoided.

DETAILED DESCRIPTION OF THE PREFERRED EMBODIMENT

Figure 2A:
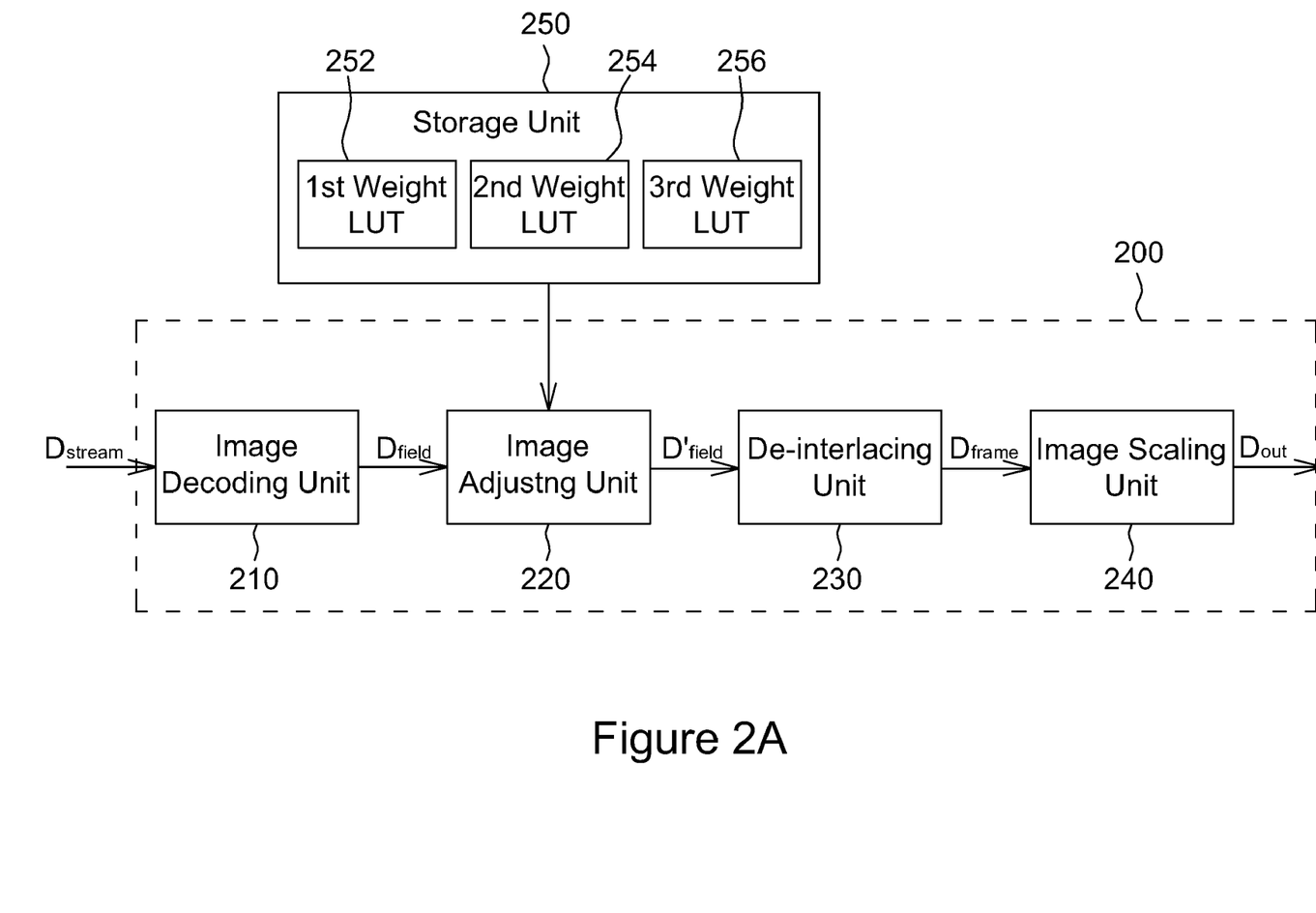
FIG. 2A is schematic diagram of an image processing apparatus in accordance with a first embodiment of the present disclosure.
Figure 2B:
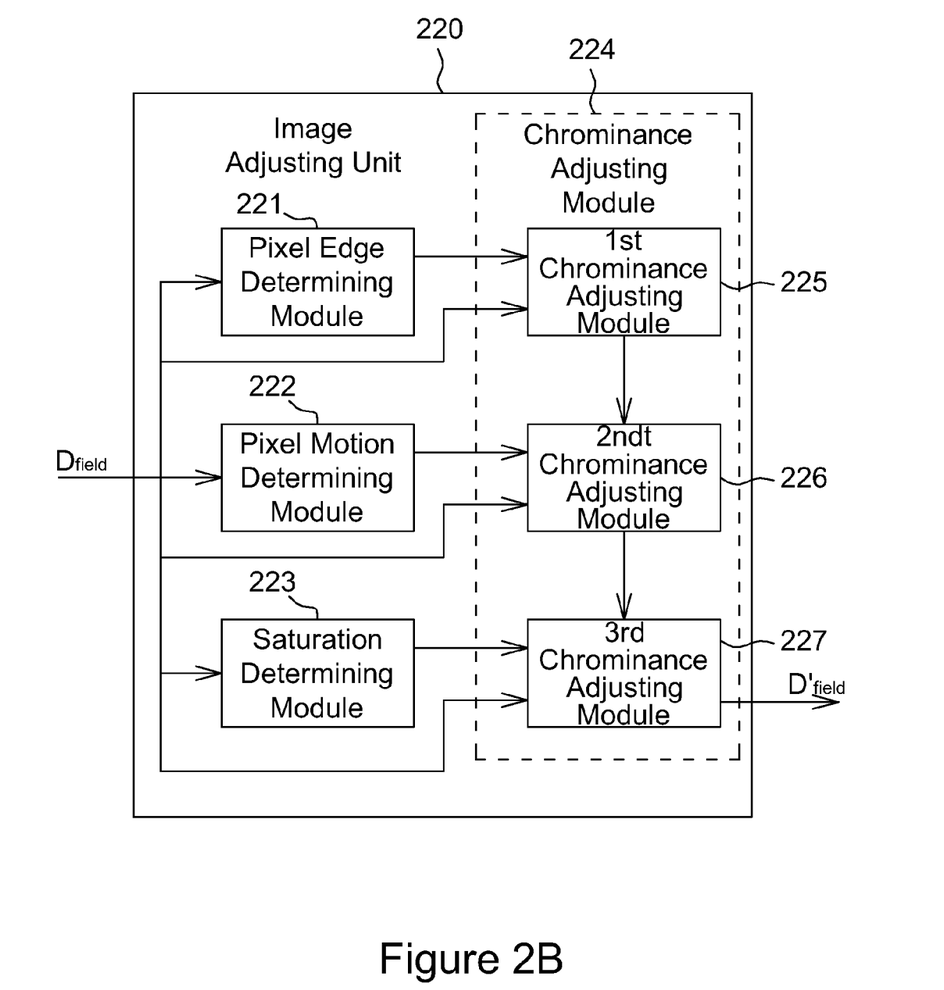
FIG. 2B is a schematic diagram of the image adjusting unit in FIG. 2A.

FIG. 2A and FIG. 2B show schematic diagrams of an image processing apparatus 200 in accordance with an embodiment of the present disclosure. The image processing apparatus 200 comprises an image decoding unit 210, an image adjusting unit 220, a de-interlacing unit 230, and an image scaling unit 240. The image adjusting unit 220 comprises a pixel edge determining unit 221, a pixel motion determining module 222, a saturation determining module 223, and a chrominance adjusting module 224. The chrominance adjusting unit 224 comprises a first chrominance adjusting module 225, a second chrominance adjusting module 226, and a third chrominance adjusting module 227. The image adjusting unit 220 is coupled to a storage unit 250 comprising weight lookup tables 252, 254 and 256. In addition, the image processing apparatus 200 is realized by hardware or software.

Figure 3A:
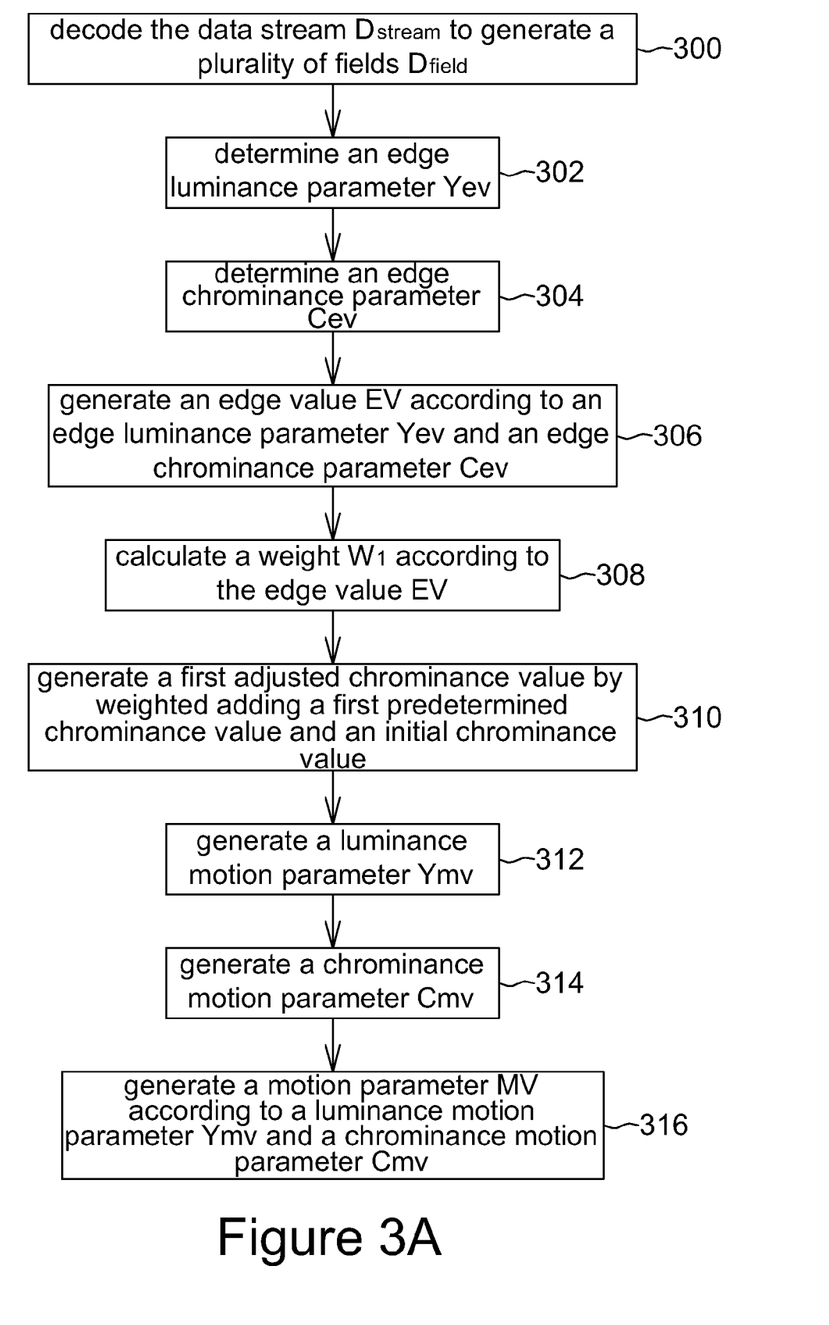
FIG. 3A and FIG. 3B are flow charts of performing image processing on a data stream by the image processing apparatus in FIG. 2A and FIG. 2B.
Figure 3B:
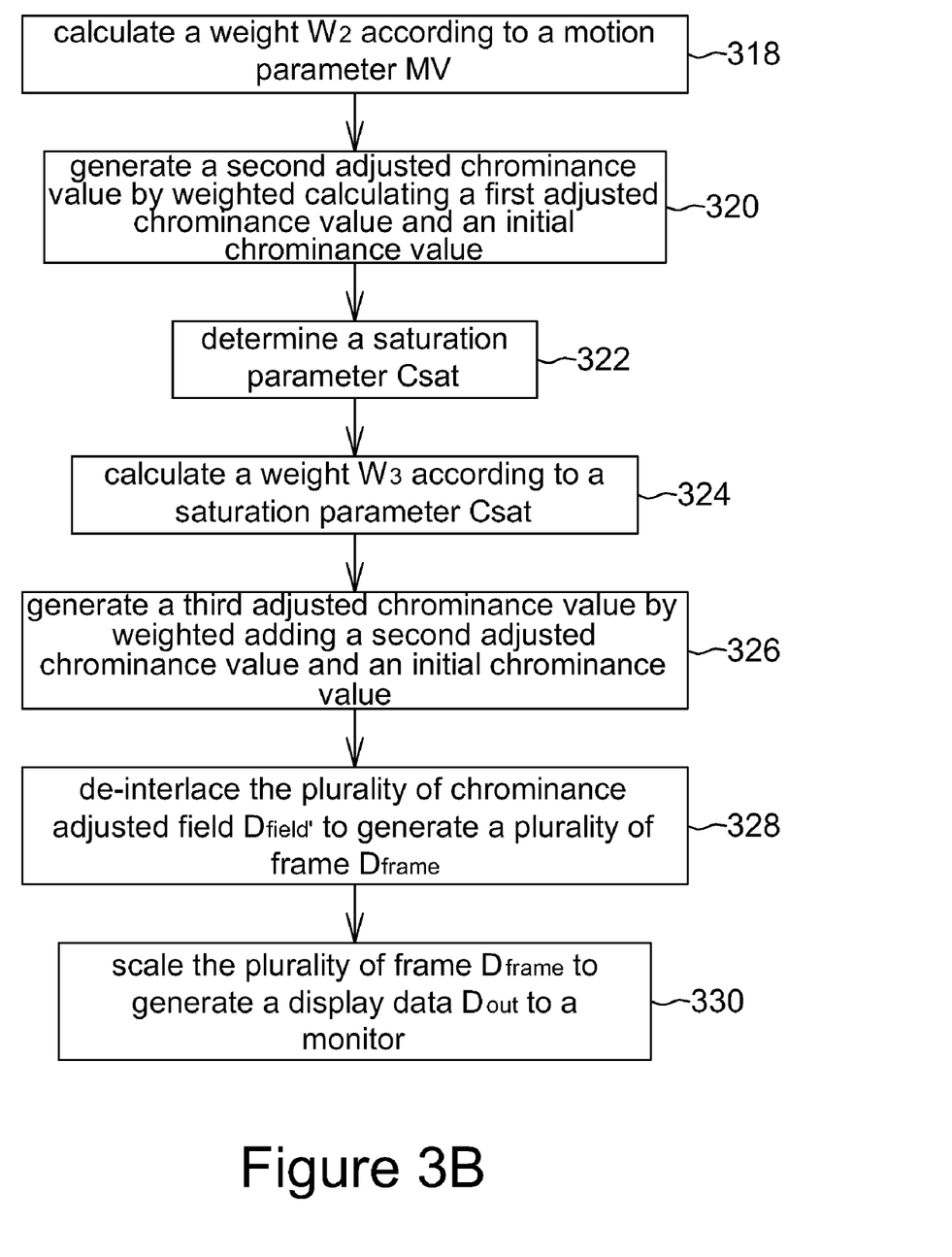

The description below is given with reference to FIGS. 2A, 2B, 3A and 3B. FIG. 3A and FIG. 3B are flow charts of the image processing apparatus 200 performing image processing on a data stream $D_{stream}$. In Step 300, the image decoding unit 210 decodes the data stream $D_{stream}$ to generate a plurality of fields $D_{field}$ in FIG. 4. The plurality of fields $D_{field}$ comprise a previous even field $F_{0\_even}$, a previous odd field $F_{0\_odd}$, a current even field $F_{1\_even}$, and a current odd field $F_{1\_odd}$. Each of the field $F_{0\_even}$, $F_{0\_odd}$, $F_{1\_even}$ and $F_{1\_odd}$ comprises an initial luminance value and an initial chrominance value of each pixel (i.e., $P_{11}$, $P_{12}$, $P_{13}$, ...). The initial luminance value is directly decoded original luminance value or is noise-processed luminance value; likewise, the initial chrominance value is a directly decoded original chrominance value or is noise-processed chrominance value. In addition, the field $F_{0\_even}$ and $F_{1\_even}$ have pixels at same positions on an image, i.e., the pixels $P_{11}$, $P_{12}$, $P_{13}$, ..., of the field $F_{0\_even}$ and $F_{1\_even}$ are at the same positions on the image.

Figure 4:
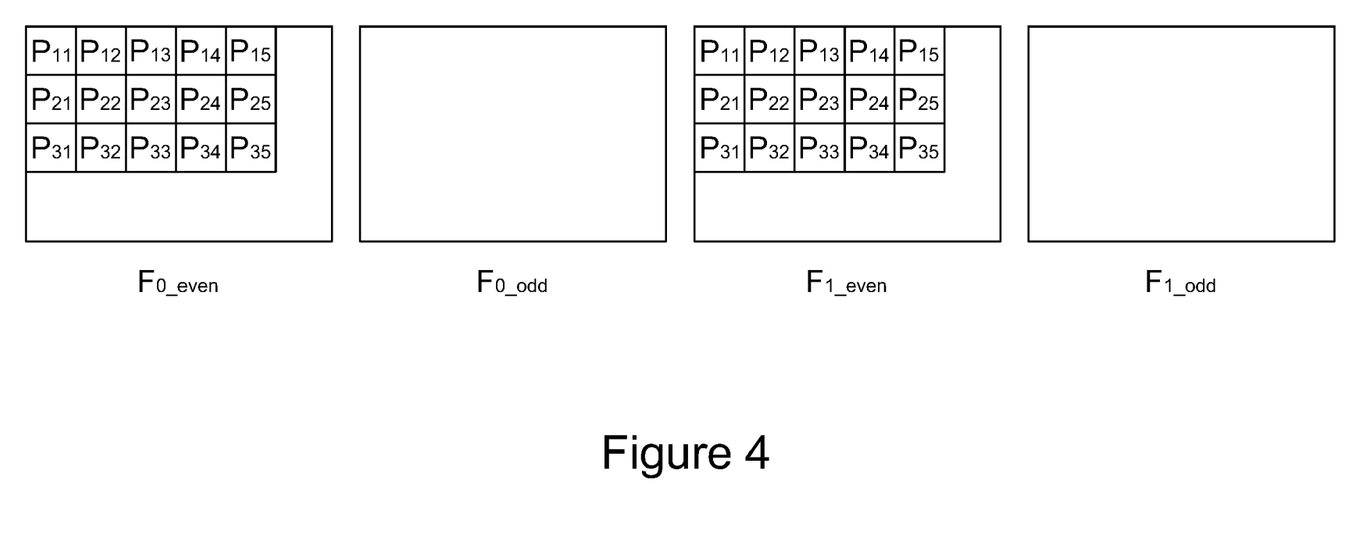
FIG. 4 is a schematic diagram of a plurality of fields.

In Step 302, for a pixel at a target position of the current field $F_{1\_even}$, the pixel edge determining module 221 determines an edge luminance parameter Yev according to a luminance value of the pixel at the target position of the field $F_{1\_even}$ and a luminance value of at least one pixel neighboring the pixel at the target position. Taking the pixel $P_{13}$ at the current field $F_{1\_even}$ as an example, an edge luminance parameter $Yevp_{13}$ of the pixel $P_{13}$ is calculated as:

$$Yev_{P13} = a_1 * |Y_{12\_1} - Y_{11\_1}| + a_2 * |Y_{13\_1} - Y_{12\_1}| + a_3 * |Y_{14\_1} - Y_{13\_1}| + a_4 * |Y_{15\_1} - Y_{14\_1}| \qquad (1)$$

Wherein, $Y_{11\_1}$, $Y_{12\_1}$, $Y_{13\_1}$, $Y_{14\_1}$ and $Y_{15\_1}$ are respectively initial luminance values of the pixels $P_{11}$, $P_{12}$, $P_{13}$, $P_{14}$ and $P_{15}$ at the current field $F_{1\_even}$, and $a_1$, $a_2$, $a_3$, $a_4$ and $a_5$ are constants.

It is to be noted that, the foregoing equation for calculating the edge luminance parameter $Yev_{P13}$ is disclosed for illustration purposes, and other approaches may also be applied to calculate the edge luminance parameter $Yevp_{13}$. For example, the edge luminance parameter $Yevp_{13}$ is calculated according to a luminance difference between the pixel $P_{13}$ and a plurality of pixels neighboring the pixel $P_{13}$ in a two dimensional plane. Taking a pixel $P_{22}$ at the current field $F_{1\_even}$ as an example, an edge luminance parameter $Yevp_{22}$ of the pixel $P_{22}$ is calculated as:

$$Yev_{P22} = b_{11} * |Y_{22\_1} - Y_{11\_1}| + b_{12} * |Y_{22\_1} - Y_{12\_1}| + b_{13} * |Y_{22\_1} - Y_{13\_1}| + b_{21} * |Y_{22\_1} - Y_{21\_1}| + b_{23} * |Y_{22\_1} - Y_{23\_1}| + b_{31} * |Y_{22\_1} - Y_{31\_1}| + b_{32} * |Y_{22\_1} - Y_{32\_1}| + b_{33} * |Y_{22\_1} - Y_{33\_1}| \qquad (2)$$

Wherein, $Y_{11\_1}$ to $Y_{33\_1}$ are respectively initial chrominance values of pixels $P_{11}$ to $P_{33}$ at the current field $F_{1\_even}$, and $b_{11}$ to $b_{33}$ are constants. It is to be noted that, other calculation approaches can be applied to calculate an edge luminance parameter, provided that an edge luminance parameter of a pixel $P_{xy}$ is determined according to a luminance value of the pixel $P_{xy}$ and a luminance value of at least one pixel neighboring the pixel $P_{xy}$, and a designer can obtain the edge luminance parameter of the pixel $P_{xy}$ via other formulae according to different design considerations.

After that, in Step 304, for the pixel at the target position of the current field $F_{1\_even}$, the pixel edge determining module 221 determines an edge chrominance parameter Cev according to an initial chrominance value of the pixel at the target position and an initial chrominance value of at least one pixel neighboring the pixel at the target position. Taking the pixel $P_{13}$ at the current field $F_{1\_even}$ as an example, supposing that the image is in the conventional YUV444 format, the edge chrominance parameter $Cevp_{13}$ of the pixel $P_{13}$ is calculated as:

$$Cev_{P13} = a_1 * |C_{12\_1} - C_{11\_1}| + a_2 * |C_{13\_1} - C_{12\_1}| + a_3 * |C_{14\_1} - C_{13\_1}| + a_4 * |C_{15\_1} - C_{14\_1}| \qquad (3)$$

Wherein, $C_{11\_1}$, $C_{12\_1}$, $C_{13\_1}$, $C_{14\_1}$ and $C_{15\_1}$ are respectively initial chrominance values of the pixels $P_{11}$, $P_{12}$, $P_{13}$, $P_{14}$ and $P_{15}$ at the current field $F_{1\_even}$, and $a_1$, $a_2$, $a_3$, $a_4$ and $a_5$ are constants. It is to be noted that, either the chrominance component U or the chrominance component V, or the combination of the chrominance components U and V can be regarded as the initial chrominance value for calculating the foregoing edge chrominance parameter. When the image is in the conventional YUV422 format, the edge chrominance parameter $Cev_{P13}$ of the pixel $P_{13}$ is calculated as:

$$Cev_{P13} = c_1 * |C_{13\_1} - C_{11\_1}| + c_2 * |C_{14\_1} - C_{12\_1}| + c_3 * |C_{15\_1} - C_{13\_1}| \qquad (4)$$

Wherein, c1, c2 and C3 are constants, and the initial chrominance value is either the chrominance component U or V.

In addition, the edge chrominance parameter Cev may be calculated according to a chrominance difference between the pixel and the pixels neighboring the pixel in a 2D plane, and the approach for calculating the edge chrominance value Cev is similar to that for calculating the edge luminance parameter Yev, such that details thereof shall not be described for brevity. Provided that an edge luminance value of a pixel $P_{xy}$ is determined according to an initial chrominance value of the pixel $P_{xy}$ and an initial chrominance value of at least one pixel neighboring the pixel $P_{xy}$, a designer can obtain the edge chrominance value of the pixel $P_{xy}$ via other formulae according to different design considerations.

An edge luminance parameter Yev of a pixel at a target position represents a luminance difference between the pixel at the target position and pixels neighboring the pixel at the target position. More specifically, a large edge luminance parameter Yev means that the pixel at the target position is likely at an edge area of an object in an image, i.e., a junction area of the object and its background. In contrast, a small edge luminance parameter Yev means that the pixel at the target position is likely located in a flat area of the object or of the background of the image. Likewise, an edge chrominance parameter Cev of the pixel at the target position represents a chrominance difference between the pixel at the target position and the pixels neighboring the pixel at the target position. More specifically, a large edge chrominance parameter Cev means that the pixel at the target position is likely located in an area of cross-color. In contrast, a small edge chrominance parameter Cev means that the pixel at the target position is not within the cross-color area.

In Step 306, the first chrominance adjusting module 225 generates an edge value EV according to an edge luminance parameter Yev and an edge chrominance parameter Cev of a pixel at a target position. Taking the pixel $P_{13}$ at the current field $F_{1\_even}$ as an example, an edge value $EV_{P13}$ of the pixel $P_{13}$ is calculated as:

$$EV_{P13}=Yev_{P13}*Cev_{P13} \quad (5)$$

Wherein, the edge value $EV_{P13}$ is used for determining whether the pixel $P_{13}$ is at an edge area of a cross-color area in the image. When the calculated edge value $EV_{P13}$ is large, i.e., when the edge luminance parameter $Yev_{P13}$ and the edge chrominance parameter $Cev_{P13}$ are large, the pixel $P_{13}$ is likely at the edge of the cross-color area in the image. Otherwise, when the calculated edge value $EV_{P13}$ is small, it means that the pixel $P_{13}$ is not at the edge of the cross-color area.

Figure 5:
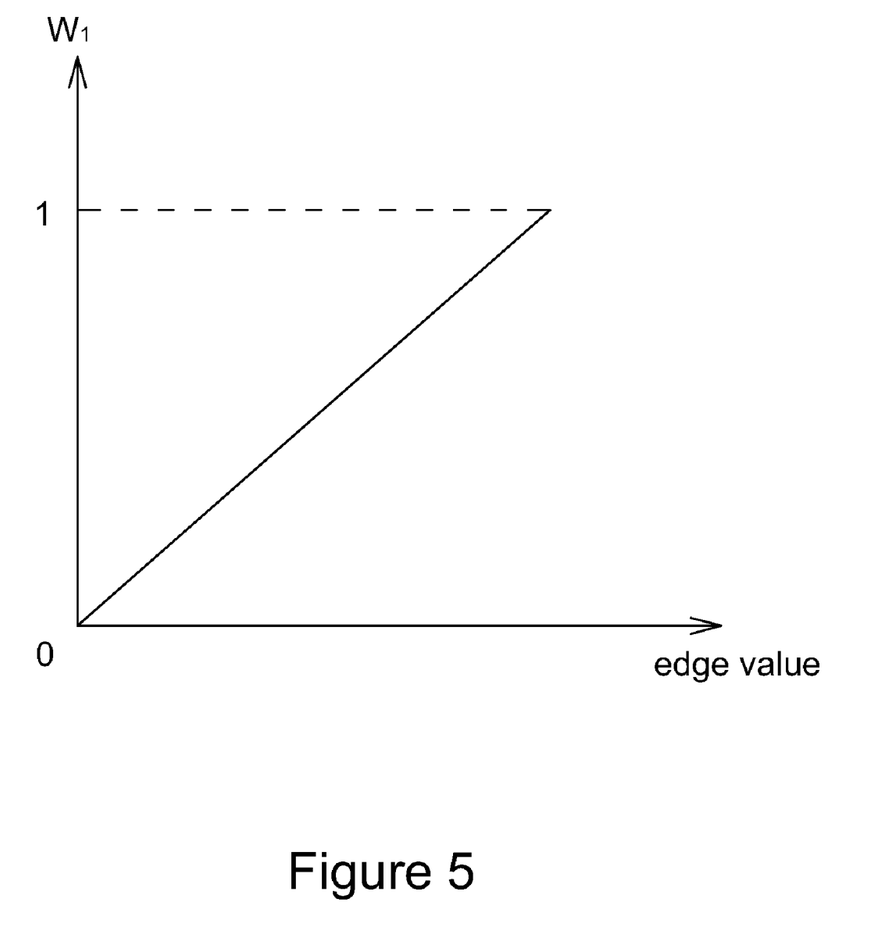
FIG. 5 is a characteristic curve of an edge value and a weight.

In Step 308, the first chrominance adjusting module 225 calculates a weight $W_1$ according to a characteristic curve in FIG. 5 or a first weight lookup table 252 stored in the storage unit 250 in FIG. 2A. It is to be noted that, in the characteristic curve in FIG. 5, the edge value EV is directly proportional to the weight $W_1$; however, in other embodiments, a edge value EV that is approximately positively correlated with the weight $W_1$ may also be adopted.

In Step 310, the first chrominance adjusting module 225 by weight adds a first predetermined chrominance value and an initial chrominance value of a pixel at a target position of the field $F_{1\_even}$ to generate a first adjusted chrominance value. Taking the pixel $P_{13}$ of the field $F_{1\_even}$ as an example, supposing that the first predetermined chrominance value corresponds to the white color (i.e., supposing that the first predetermined chrominance value is a 10-bit data corresponding to the chrominance value 512 of the white color), a first adjusted chrominance value $C'_{13\_1}$ is calculated as:

$$C'_{13\_1}=W_1*512+(1-W_1)*C_{13\_1} \quad (6)$$

Wherein, $C_{13\_1}$ is an initial chrominance value of the pixel $P_{13}$. Yet, the first predetermined chrominance value, defined as 512 in the above equation, may be defined as other values according to designer considerations.

With reference to the equations for calculating a first adjusted chrominance value in Step 306, Step 308 and Step 310, it is deduced that, when the edge luminance parameter $Yev_{P13}$ and the edge chrominance parameter $Cev_{P13}$ of the pixel $P_{13}$ are positively correlated with the weight of the first predetermined chrominance value, the edge luminance parameter $Yev_{P13}$ and the edge chrominance parameter $Cev_{P13}$ of the pixel $P_{13}$ are negatively correlated with the weight of the initial chrominance value of the pixel $P_{13}$. The physical meaning is explained below. When the pixel $P_{13}$ is within an edge area with cross-color effect in the image, the edge value $EV_{P13}$ and the weight $W_1$ are large, such that the first adjusted chrominance value $C'_{13\_1}$ is approximate to that of the white color, and over-brightness at the edge area due to cross-color is alleviated. When the pixel $P_{13}$ is within an edge area without cross-color effect, the edge value $EV_{P13}$ and the weight $W_1$ are smaller, such that the first adjusted chrominance value $C'_{13\_1}$ of the pixel $P_{13}$ is approximate to the initial chrominance value $C_{13\_1}$, i.e., the initial chrominance value $C_{13\_1}$ does not need much adjustment.

In Step 312, for a pixel at a target position of the current field $F_{1\_even}$, the pixel motion determining module 222 calculates a luminance difference between luminance values of the pixel at the target position of the current field $F_{1\_even}$ and the previous field $F_{0\_even}$, generates a luminance motion parameter Ymv according to the luminance difference. Taking the pixel $P_{13}$ at the current filed data $F_{1\_even}$ as an example, a luminance motion parameter $Ymv_{P13}$ of the pixel $P_{13}$ is calculated either of the two equations below.

$$Ymv_{P13}=|Y_{13\_1}-Y_{13\_0}| \quad (7)$$

$$Ymv_{P13}=d_1*|Y_{11\_1}-Y_{11\_0}|+d_2*|Y_{12\_1}-Y_{12\_0}|+ \\ d_3*|Y_{13\_1}-Y_{13\_0}|+d_4*|Y_{14\_1}-Y_{14\_0}|+ \\ d_5*|Y_{15\_1}-Y_{15\_0}| \quad (8)$$

Wherein, $Y_{11\_1}$, $Y_{12\_1}$, $Y_{13\_1}$, $Y_{14\_1}$ and $Y_{15\_1}$ are respectively initial luminance values of the pixels $P_{11}$, $P_{12}$, $P_{13}$, $P_{14}$ and $P_{15}$ at the current field $F_{1\_even}$, $Y_{11\_0}$, $Y_{12\_0}$, $Y_{13\_0}$, $Y_{14\_0}$ and $Y_{15\_0}$ are respectively initial luminance values of the pixels $P_{11}$, $P_{12}$, $P_{13}$, $P_{14}$ and $P_{15}$ at the previous field $F_{0\_even}$, and $d_1$, $d_2$, $d_3$, $d_4$ and $d_5$ are constants (e.g., $d_1$, $d_2$, $d_3$, $d_4$ and $d_5$ are respectively (⅛, ¼, ¼, ¼, ⅛)).

It is to be noted that, the foregoing equations for calculating the luminance motion parameter $Ymv_{P13}$ is described for illustration purposes.

In other embodiments of the present disclosure, other approaches may be applied to calculate the luminance motion parameter $Ymv_{P13}$ of the pixel $P_{13}$. For example, the luminance motion parameter $Ymv_{P13}$ is calculated according to a luminance difference between the pixel $P_{13}$ and pixels neighboring the pixel $P_{13}$ in a 2D plane. Taking a pixel $P_{22}$ at the current field $F_{1\_even}$ as an example, a luminance motion parameter $Ymv_{P22}$ of the pixel $P_{22}$ is calculated as:

$$Ymv_{P22}=h_{11}*|Y_{11\_1}-Y_{11\_0}|+h_{12}*|Y_{12\_1}-Y_{12\_0}|+ \\ h_{13}*|Y_{13\_1}-Y_{13\_0}|+h_{21}*|Y_{21\_1}-Y_{21\_0}|+ \\ h_{22}*|Y_{22\_1}-Y_{22\_0}|+h_{23}*|Y_{23\_1}-Y_{23\_0}|+ \\ h_{31}*|Y_{31\_1}-Y_{31\_0}|+h_{32}*|Y_{32\_1}-Y_{32\_0}|+ \\ h_{33}*|Y_{33\_1}-Y_{33\_0}| \quad (9)$$

Wherein, $Y_{11\_1}$ to $Y_{33\_1}$ are respectively initial chrominance values of pixels $P_{11}$ to $P_{33}$ at the current field $F_{1\_even}$, $Y_{11\_0}$ to $Y_{33\_0}$ are initial luminance values of the pixels $P_{11}$ to $P_{33}$ at the previous field $F_{0\_even}$, and $h_{11}$ to $h_{33}$ are constants. It is to be noted that, other calculation approaches can be applied to calculate a luminance motion parameter, provided that a luminance motion parameter of a pixel $P_{xy}$ is determined according to a luminance difference between luminance values of the pixel $P_{xy}$ at the current field $F_{1\_even}$ and the previous field $F_{0\_even}$, and a designer can obtain the luminance motion parameter of the pixel $P_{xy}$ via other formulae according to different design considerations.

In Step 314, for a pixel at a target pixel at the field $F_{1\_even}$, the pixel motion determining module 222 calculates a chrominance difference between chrominance values of the pixel at the target position of the current field $F_{1\_even}$ and the previous field $F_{0\_even}$, and generates a chrominance motion parameter Cmv according to the chrominance difference. Taking the pixel $P_{13}$ at the current field $F_{1\_even}$ as an example, the chrominance motion parameter $Cmv_{P13}$ of the pixel $P_{13}$ is calculated by either of the two equations below.

$$Cmv_{P13} = |C_{13\_1} - C_{13\_0}| \tag{10}$$

$$\begin{aligned}Cmv_{P13} = &d_1 * |C_{11\_1} - C_{11\_0}| + d_2 * |C_{12\_1} - C_{12\_0}| + \\ &d_3 * |C_{13\_1} - C_{13\_0}| + d_4 * |C_{14\_1} - C_{14\_0}| + \\ &d_5 * |C_{15\_1} - C_{15\_0}|\end{aligned} \tag{11}$$

Wherein, $C_{11\_1}$, $C_{12\_1}$, $C_{13\_1}$, $C_{14\_1}$, and $C_{15\_1}$ are respectively initial chrominance values of the pixel $P_{11}$, $P_{12}$, $P_{13}$, $P_{14}$ and $P_{15}$ at the current field $F_{1\_even}$, $C_{11\_0}$, $C_{12\_0}$, $C_{13\_0}$, $C_{14\_0}$, and $C_{15\_0}$ are respectively initial chrominance values of the pixel $P_{11}$, $P_{12}$, $P_{13}$, $P_{14}$ and $P_{15}$ at the previous field $F_{0\_even}$, and $d_1, d_2, d_3, d_4$ and $d_5$ are constants. It is to be noted that, either of chrominance components U and V, or both of the chrominance values U and V, can be the initial chrominance values for calculating the foregoing chrominance motion parameter. In addition, a chrominance motion parameter Cmv may be obtained according to a chrominance difference of chrominance values of neighboring pixels in a 2D plane, and the calculation approach is similar to that for calculating the luminance motion parameter Ymv, such that detailed thereof shall not be described for brevity. Provided that the chrominance motion parameter of the pixel $P_{xy}$ is determined according to a chrominance difference between chrominance values of the pixel $P_{xy}$ at the current field $F_{1\_even}$ and the previous field $F_{0\_even}$, a designer can obtain the chrominance motion parameter Cmv of the pixel $P_{xy}$ via other formulae according to different design considerations.

The luminance motion parameter Ymv and the chrominance motion parameter Cmv are used for representing a degree of motion of an object in the image (i.e., the current field $F_{1\_even}$), i.e., when either a luminance motion parameter Ymv or a chrominance motion parameter Cmv of a pixel at a target pixel is large, it means that the object corresponding to the pixel at the target position on the image frame is moving or changing. When both of the luminance motion parameter Ymv and the chrominance motion parameter Cmv of the pixel at the target pixel are small, it means that the object corresponding to the pixel at the target position in the image is likely static.

In Step 316, the second chrominance adjusting module 226 generates a motion parameter MV according to a luminance motion parameter Ymv and a chrominance motion parameter Cmv. Taking the pixel $P_{13}$ at the current field $F_{1\_even}$ as an example, a motion parameter $MV_{P13}$ is calculated as:

$$MV_{P13} = \text{Min}\{Ymv_{P13}, Cmv_{P13}\} \tag{12}$$

Wherein, Min{ } is a minimum operator, $Ymv_{P13}$ is a luminance motion parameter of the pixel $P_{13}$, and $Cmv_{P13}$ is a chrominance motion parameter of the pixel $P_{13}$. It is to be noted that, the motion parameter $MV_{P13}$ is used for representing a degree of motion of the pixel $P_{13}$, and the calculation approach therefore is not limited to Equation 12.

Figure 6:
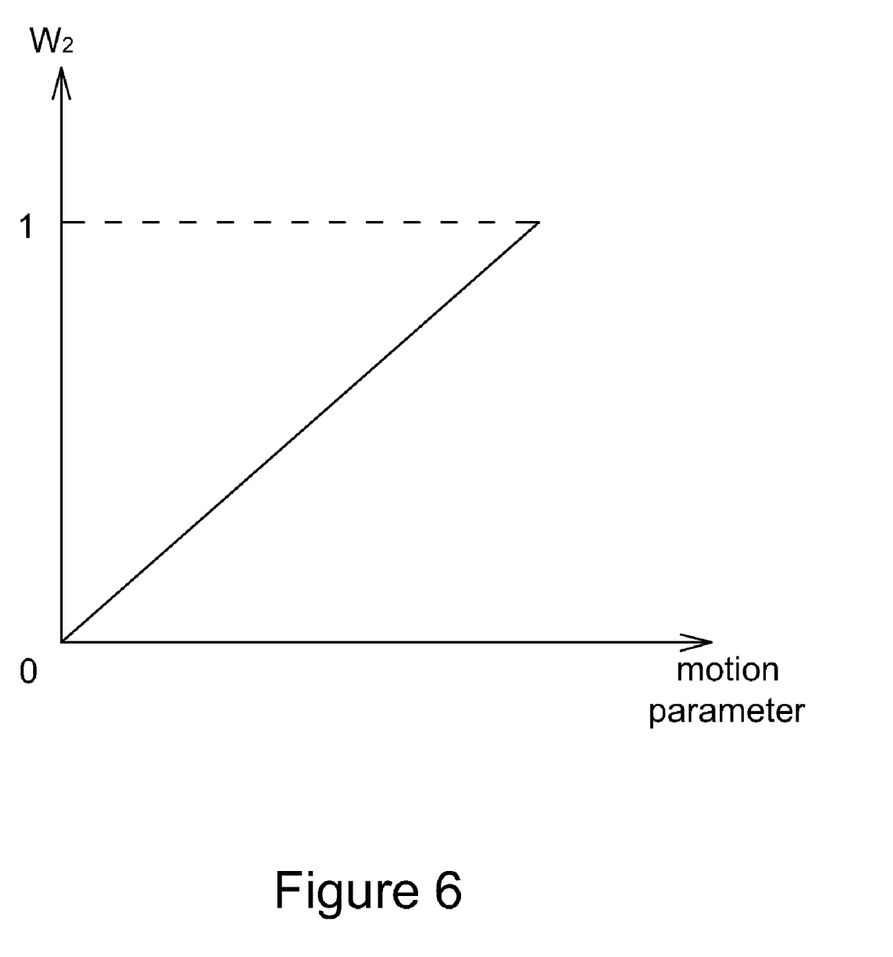
FIG. 6 is a characteristic curve of a motion parameter and a weight.

In Step 318, the second chrominance adjusting module 226 calculates a weight $W_2$ according to a motion parameter MV, and the weight $W_2$ is determined according to a characteristic curve in FIG. 6, or according to a second weight lookup table 254 stored in the storage unit 250 in FIG. 2A. It is to be noted that, in the characteristic curve in FIG. 6, the motion parameter MV is directly proportional to the weight $W_2$; however, in other embodiments, a motion parameter EV that is approximately positively correlated with the weight $W_2$ may also be adopted.

In Step 320, the second chrominance adjusting module 226 by weighted calculates a first adjusted chrominance value C' of a pixel at a target position and an initial chrominance value of the pixel at the target position of the field $F_{1\_even}$ to generate a second adjusted chrominance value C". Taking the pixel $P_{13}$ at the current field $F_{1\_even}$ as an example, the second adjusted chrominance value $C''_{13\_1}$ is calculated as:

$$C''_{13\_1} = W_2 * C'_{13\_1} + (1 - W_2) * C_{13\_1} \tag{13}$$

Wherein, $C_{13\_1}$ is an initial chrominance value of the pixel $P_{13}$, and $C'_{13\_1}$ is a first adjusted chrominance value of the pixel $P_{13}$.

With reference to the equations for calculating a first adjusted chrominance value in Step 316 to Step 320, either the luminance motion parameter $Ymv_{P13}$ or the chrominance motion parameter $Cmv_{P13}$ of the pixel $P_{13}$ is positively correlated with the weight of the first adjusted chrominance value $C'_{13\_1}$, and either the luminance motion parameter $Ymv_{P13}$ or the chrominance motion parameter $Cmv_{P13}$ of the pixel $P_{13}$ is negatively correlated with the weight of the initial chrominance value $C_{P13}$. The physical meaning is explained below. When an image frame corresponding to the pixel $P_{13}$ shows a large motion or variation, the second adjusted chrominance value $C''_{13\_1}$ becomes approximate to the first adjusted chrominance value $C'_{13\_1}$; when the image frame corresponding to the pixel $P_{13}$ is static or only shows a small motion or variation, the second adjusted chrominance value $C''_{13\_1}$ becomes approximate to the initial chrominance value $C_{13\_1}$.

In addition, although the first adjusted chrominance value $C'_{13\_1}$ or the second adjusted chrominance value $C''_{13\_1}$ is applied to overcome cross-color, since the first adjusted chrominance value $C'_{13\_1}$ is generated by weighted calculating a first predetermined chrominance value and the initial chrominance value $C_{13\_1}$ of the pixel $P_{13}$, the saturation of the first adjusted chrominance value $C'_{13\_1}$ or the second adjusted chrominance value $C''_{13\_1}$ is reduced (because the first predetermined chrominance value corresponds to the white color in this embodiment), thereby causing distortion in the chrominance of the pixel $P_{13}$. Therefore, in order to solve the foregoing problem, in Step 322, the saturation determining module 223 determines a saturation parameter Csat according to a difference between the initial chrominance value of the pixel at the target position and a second predetermined chrominance value. Taking the pixel $P_{13}$ at the current field $F_{1\_even}$ as an example, supposing that the second predetermined chrominance value is the same as the first predetermined chrominance value corresponding to the white color (supposing that the chrominance value of the white color is a 10-bit data equal to 512), the saturation parameter $Csat_{P13}$ is calculated as to the following, for example:

$$Csat_{P13} = |C_{13\_1} - 512| \tag{14}$$

Wherein, $C_{13\_1}$ is the initial chrominance value of the pixel $P_{13}$ at the field $F_{1\_even}$.

The saturation parameter $Csat_m$ represents a chrominance saturation of the pixel $P_{13}$, i.e., the chrominance value of the pixel $P_{13}$ is farther from that of the white color as the saturation parameter $Csat_m$ gets larger, and the chrominance value of the pixel $P_{13}$ is closer to that of the white color as the saturation parameter $Csat_m$ gets smaller.

Figure 7:
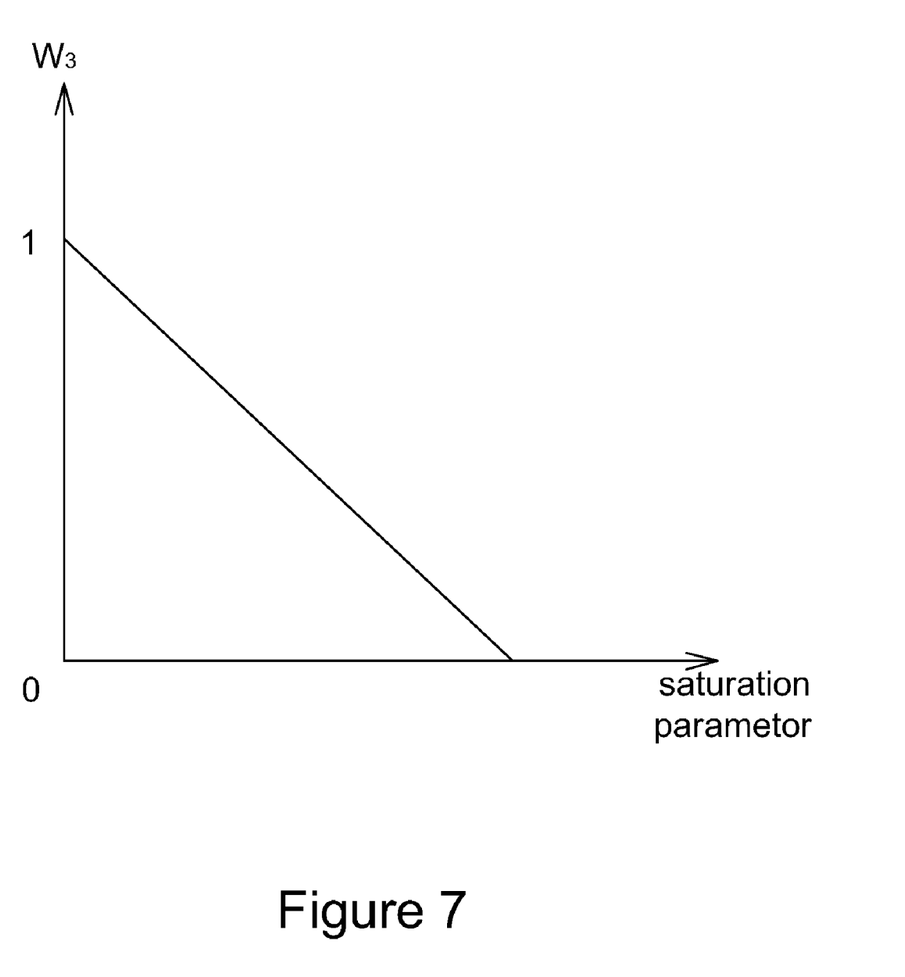
FIG. 7 is a characteristic curve of a saturation parameter and a weight.

In Step 324, the third chrominance adjusting module 227 calculates a weight $W_3$ according to a saturation parameter Csat, with the weight $W_3$ being determined according to a characteristic curve in FIG. 7 or a third weight lookup table 256 stored in the storage unit 250 in FIG. 2A. It is to be noted that, in the characteristic curve in FIG. 7, the saturation parameter Csat is inversely proportional to the weight $W_3$; however, in other embodiments, a saturation parameter is that is approximately negatively correlated with the weight $W_3$ may also be adopted.

In Step 326, the third chrominance adjusting module 227 by weighted adds a second adjusted chrominance value C" of a pixel at a target and an initial chrominance value of the pixel at the target position of the field $F_{1\_even}$ to generate a third adjusted chrominance value C'''. Taking the pixel $P_{13}$ at the current field $F_{1\_even}$ as an example, a third adjusted chrominance value $C'''_{13\_1}$ of the pixel $P_{13}$ is calculated as:

$$C'''_{13\_1} = W_3 * C''_{13\_1} + (1-W_3) * C_{13\_1} \quad (15)$$

Wherein, $C_{13\_1}$ is the initial chrominance value of the pixel $P_{13}$, and $C''_{13\_1}$ is the second adjusted chrominance value of the pixel $P_{13}$.

As observed from Step 322 to Step 326, a weight of the saturation parameter $Csat_{P13}$ of the pixel $P_{13}$ is negatively correlated with a weight of the second adjusted chrominance value $C''_{13\_1}$, and is positively correlated with a weight of the initial chrominance value $C_{P13}$. The physical meaning is explained below. When a chrominance of the pixel $P_{13}$ has a low saturation, the third adjusted chrominance value $C'''_{13\_1}$ is approximate to the second adjusted chrominance value $C''_{13\_1}$; when the chrominance of the pixel $P_{13}$ has a high saturation, the third adjusted chrominance value $C'''_{13\_1}$ is approximate to the initial chrominance value $C_{P13}$, so as to avoid distortion in the chrominance of the pixel $P_{13}$.

The foregoing operations for adjusting a chrominance value is performed on all pixels at the field $F_{1\_even}$ and $F_{1\_odd}$ to generate a plurality of chrominance adjusted field $D_{field'}$ to the de-interlacing unit 230.

In Step 328, the de-interlacing unit 230 de-interlaces the plurality of chrominance adjusted field $D_{field'}$ to generate a plurality of frame $D_{frame}$. In Step 330, the image scaling unit 240 scales the plurality of frame $D_{frame}$ to generate a display data $D_{out}$ to a monitor.

It is to be noted that, in Step 306 to Step 310 of the flow shown in FIG. 3A, when the pixel $P_{13}$ is at the target position, the pixel edge determining module 221 determines the first adjusted chrominance value $C'_{13\_1}$ according to the edge luminance parameter $Yev_{P13}$, the edge chrominance parameter $Cev_{P13}$, the first predetermined chrominance value and the initial chrominance value $C_{13\_1}$ of the pixel $P_{13}$ at the field $F_{1\_even}$. After that, in Step 316 to Step 320, the pixel motion determining module 222 determines the second adjusted chrominance parameter $C''_{13\_1}$ according to the luminance motion parameter $Ymv_{P13}$, the chrominance motion parameter $Cmv_{P13}$, the first adjusted chrominance value $C'_{13\_1}$ and the initial chrominance value $C_{13\_1}$ of the pixel $1^3_{13}$ at the field $F_{1\_even}$. In Step 324 to Step 326, the saturation determining module 223 determines the third adjusted chrominance value $C'''_{13\_1}$ according to the saturation parameter $Csat_{P13}$, the second adjusted chrominance value $C''_{13\_1}$, and the initial chrominance value $C_{13\_1}$ of the pixel $1^3_{13}$ at the field $F_{1\_even}$. However, in another embodiment of the present disclosure, the chrominance adjusting module 224 may directly determine the third adjusted chrominance value $C'''_{13\_1}$ according to the edge luminance parameter $Yev_{P13}$, the edge chrominance parameter $Cev_{P13}$, the luminance motion parameter $Ymv_{P13}$, the chrominance motion parameter $Cm_{P13}$, the saturation parameter $Csat_{P13}$, the first predetermined chrominance value, and the initial chrominance value $C_{13\_1}$ of the pixel $P_{13}$ in the field $F_{1\_even}$. That is to say, the first, second and third chrominance adjusting modules 225 to 227 can be discarded, and the third adjusted chrominance value $C'''_{13\_1}$ is calculated as:

$$C'''_{13\_1} = W * 512 + (1-W) * C_{13\_1} \quad (16)$$

Wherein, W is a weight determined according to the edge luminance parameter $Yev_{P13}$, the edge chrominance parameter $Cev_{P13}$, the luminance motion parameter $Ymv_{P13}$, the chrominance motion parameter $Cmv_{P13}$, the saturation parameter $Csat_{P13}$ or obtained by looking up a lookup table. The edge luminance parameter $Yev_{P13}$ and the edge chrominance parameter $Cev_{P13}$ are positively correlated with the weight W, either the luminance motion parameter $Ymv_{P13}$ or the chrominance motion parameter $Cmv_{P13}$ is positively correlated with the weight W, and the saturation parameter $Csat_{P13}$ is negatively correlated with the weight W.

Likewise, the second chrominance adjusting module 226 determines the second adjusted chrominance value $C''_{13\_1}$ according to the edge luminance parameter $Yev_{P13}$, the edge chrominance parameter $Cev_{P13}$, the luminance motion parameter $Ymv_{P13}$, the chrominance motion parameter $Cmv_{P13}$, the first predetermined chrominance value, and the initial chrominance value $C_{13\_1}$ of the pixel $P_{13}$ at the field $F_{1\_even}$. That is, the first chrominance adjusting module 225 can be discarded, the edge luminance parameter $Yev_{P13}$ and the edge chrominance parameter $Cev_{P13}$ are directly transmitted to the second chrominance adjusting module 226, and the second adjusted chrominance value $C''_{13\_1}$ is calculated as:

$$C''_{13\_1} = W' * 512 + (1-W') * C_{13\_1} \quad (17)$$

Wherein, W' is a weight determined according to the edge luminance parameter $Yev_{P13}$, the edge chrominance parameter $Cev_{P13}$, the luminance motion parameter $Ymv_{P13}$, the chrominance motion parameter $Cmv_{P13}$ or by looking up a lookup table. The edge luminance parameter $Yev_{P13}$ and the edge chrominance parameter $Cev_{P13}$ are positively correlated with the weight W', and either the luminance motion parameter $Ymv_{P13}$ or the chrominance motion parameter $Cmv_{P13}$ is positively correlated with the weight W'.

In another embodiment of the present disclosure, a third adjusted chrominance value C''' obtained in Step 322 to Step 326 need not be calculated, i.e., a chrominance value of each of pixels contained in the plurality of chrominance adjusted field $D_{field'}$ outputted from the image adjusting unit 220 to the de-interlacing unit 230 is the second adjusted chrominance value C" calculated in Step 320.

In another embodiment of the present disclosure, the luminance motion parameter $Ymv_{P13}$, the chrominance motion parameter $Cmv_{P13}$ and the second adjusted chrominance value $C''_{13\_1}$, which are obtained in Step 312 to Step 320, need not be calculated, i.e., the third chrominance adjusting module 227 directly calculates the third adjusted chrominance value $C'''_{13\_1}$ according to the saturation parameter Csat, the first adjusted chrominance value $C'_{13\_1}$ and the initial chrominance value $C_{13\_1}$ (i.e., the pixel motion determining module 222 and the second chrominance adjusting module 226 can be discarded), and the third adjusted chrominance value $C'''_{13\_1}$ is calculated as:

$$C'''_{13\_1} = W_3 * C'_{13\_1} + (1-W_3) * C_{13\_1} \quad (18)$$

where $W_3$ is a weight calculated according to Step 324; or $$C'''_{13\_1} = W''' * 512 + (1-W''') * C_{13\_1} \quad (19)$$

where W''' is a weight calculated according to the edge luminance parameter $Yev_{P13}$, the edge chrominance parameter $Cev_{P13}$, and the saturation parameter $Csat_m$ or determined by looking for a lookup table. The edge luminance parameter $Yev_{P13}$ and the edge chrominance parameter $Cev_{P13}$ are positively correlated with the weight W", and the saturation parameter $Csat_{P13}$ is negatively correlated with the weight W".

In addition, in the foregoing description related to the image processing apparatus 200, the field $F_{0\_even}$ is a previous even field of the field $F_{1\_even}$. Accordingly, for a pixel at a same target position of the field $F_{0\_even}$ and $F_{1\_even}$, a chrominance value of the pixel at the target position of the field $F_{1\_even}$ is adjusted according to pixel data of the field $F_{0\_even}$ and $F_{1\_even}$. However, in other embodiments of the present disclosure, the field $F_{0\_even}$ may be a next field of the field $F_{1\_even}$, and the chrominance value of the pixel at the target position of the field $F_{1\_even}$ is adjusted according to pixel data of the field $F_{0\_even}$ and $F_{1\_even}$. The calculation method is identical to the flow described in FIG. 3, provided that the field $F_{0\_even}$ is regarded as the next field of the field $F_{1\_even}$. Modifications are readily apparent to a person having ordinary skills in the art, so that detailed thereof shall not described for brevity.

Figure 8:
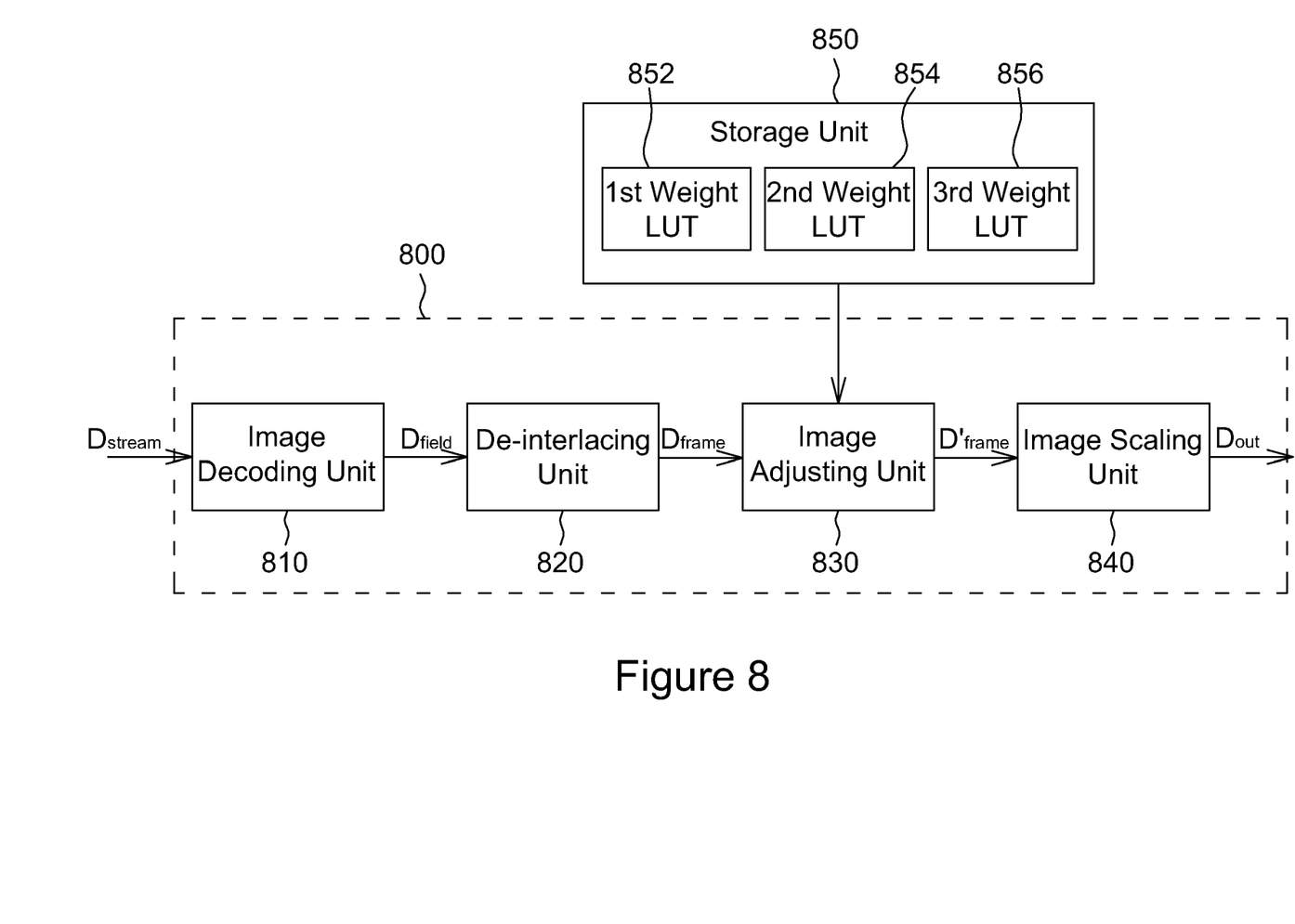
FIG. 8 is a schematic diagram of an image processing apparatus in accordance with another embodiment of the present disclosure.

FIG. 8 shows a schematic diagram of an image processing apparatus 800 in accordance with a second embodiment of the present disclosure. The image processing apparatus 800 comprises an image decoding unit 810, a de-interlacing unit 820, an image adjusting unit 830 and an image scaling unit 840. The image adjusting unit 830 is coupled to the storage unit 850 comprising weight lookup tables 852, 854 and 856. In addition, the image processing apparatus 800 is realized by hardware or software.

A difference between the image processing apparatus 800 and the image processing apparatus 200 in FIG. 2A is that the image adjusting unit 220 of the image processing apparatus 200 performs image adjusting on a field but the image adjusting unit 830 of the image processing apparatus 800 performs image adjusting on a frame data. Further, operations of the image adjusting unit 830 are similar to those of the image adjusting unit 220, and an operation flow of the image processing apparatus 800 is readily apparent to a person having ordinary skills in the art, so that detailed thereof shall not be described for brevity.

In conclusion, according to an image processing apparatus provided by the present disclosure, a degree cross-color compensation is determined according to a partial or all of an edge luminance parameter, an edge chrominance parameter, a luminance motion parameter, a chrominance motion parameter and a saturation parameter, and an adjusted chrominance value of a pixel at a target position of an edge of a motion object within an image is determined according to a predetermined chrominance value and an initial chrominance value of the pixel at the target position. That is, saturation of an edge of an area with cross-color is reduced, and accordingly image quality is improved.

While the present disclosure has been described in terms of what is presently considered to be the most practical and preferred embodiments, it is to be understood that the present disclosure needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An image processing apparatus, comprising:
   an image decoding unit that decodes a data stream to generate a first image; and
   an image adjusting unit coupled to the image decoding unit, the image adjusting unit comprising:
      a pixel edge determining module that determines an edge luminance parameter according to an initial luminance value of a first pixel of the first image and a plurality of initial luminance values of a plurality of neighboring pixels neighboring the first pixel, and determines an edge chrominance parameter according to an initial chrominance value of the first pixel and a plurality of initial chrominance values of the neighboring pixels; and
      a first chrominance adjusting module that determines a first weight according to the edge luminance parameter and the edge chrominance parameter, and generates a first adjusted chrominance value by weighted calculating a first predetermined chrominance value and the initial chrominance value of the first pixel according to the first weight.

2. The image processing apparatus as claimed in claim 1, wherein the first predetermined chrominance value corresponds to a white color.

3. The image processing apparatus as claimed in claim 1, wherein the first weight is positively correlated with the edge luminance parameter and the edge chrominance parameter.

4. The image processing apparatus as claimed in claim 1, wherein the image decoding unit further generates a second image comprising a second pixel at the same position as the first pixel at the first image, the image processing apparatus further comprising:
   a pixel motion determining module that calculates a luminance difference between the luminance values of the first pixel and the second pixel and a chrominance difference between the chrominance values of the first pixel and the second pixel; and
   a second chrominance adjusting module that determines a second weight according to the luminance difference and the chrominance difference, and generates a second adjusted chrominance value by weighted calculating the first adjusted chrominance value and the initial chrominance value of the first pixel according to the second weight.

5. The image processing apparatus as claimed in claim 4, wherein the second weight is positively correlated with either the luminance difference or the chrominance difference.

6. The image processing apparatus as claimed in claim 1, further comprising:
   a saturation determining module that determines a saturation parameter according to a difference between the initial chrominance value of the first pixel and a second predetermined chrominance value; and
   a third chrominance adjusting module that determines a third weight according to the saturation parameter, and generates a third adjusted chrominance value by weighted calculating the first adjusted chrominance value and the initial chrominance value of the first pixel at the target position according to the third weight.

7. The image processing apparatus as claimed in claim 6, wherein the third weight is positively correlated with the saturation parameter.

8. An image processing apparatus for decoding a data stream to generate a first image and a second image, the first image and the second image respectively having a first pixel and a second pixel at the same position, the image processing apparatus comprising:
   an edge determining module that determines an edge luminance parameter according to an initial luminance value of the first pixel and a plurality of pixels neighboring the first pixel, and determines an edge chrominance parameter according to an initial chrominance value of the first pixel and a plurality of initial chrominance values of pixels neighboring the first pixel;

a pixel motion determining module that calculates a luminance difference between the initial luminance value of the first pixel and an initial luminance value of the second pixel and a chrominance difference between the initial chrominance value of the first pixel and a chrominance value of the second pixel;

a saturation determining module that determines a saturation parameter according to a difference between the initial chrominance value of the first pixel and a first predetermined chrominance value; and a chrominance adjusting module that determines a weight according to the edge luminance parameter, the edge chrominance parameter, the luminance difference, the chrominance difference and the saturation parameter, and generates an adjusted chrominance value of the first pixel by weighted calculating a second predetermined chrominance value and the initial chrominance value of the first pixel according to the weight.

9. The image processing apparatus as claimed in claim 8, wherein the second predetermined chrominance value corresponds to a white color.

10. The image processing apparatus as claimed in claim 8, wherein the edge luminance parameter and the edge chrominance parameter are positively correlated with the weight, at least one of the luminance difference and the chrominance difference is positively correlated with the weight, and the saturation parameter is negatively correlated with the weight.

11. An image processing method, comprising:
  decoding a data stream to generate a first image comprising a first pixel;
  determining an edge luminance parameter according to an initial luminance value of the first pixel and a plurality of initial luminance values of pixels neighboring the first pixel;
  determining an edge chrominance parameter according to an initial chrominance value of the first pixel and a plurality of initial chrominance values of pixels neighboring the first pixel;
  determining a first weight according to the edge luminance parameter and the edge chrominance parameter; and
  generating a first adjusted chrominance value by weighted calculating a first predetermined chrominance value and the initial chrominance value of the first pixel according to the first weight.

12. The image processing method as claimed in claim 11, wherein the first predetermined chrominance value corresponds to a white color.

13. The image processing method as claimed in claim 11, wherein the first weight is positively correlated with the edge luminance parameter and the edge chrominance parameter.

14. The image processing method as claimed in claim 11, further comprising:
  decoding the data stream to generate a second image comprising a second pixel at the same position as the first pixel;
  calculating a luminance difference between the luminance value of the first pixel and a luminance value of the second pixel and a chrominance difference between the initial chrominance value of the first pixel and an initial chrominance value of the second pixel;
  determining a second weight according to the luminance difference and the chrominance difference; and
  generating a second adjusted chrominance value by weighted calculating the first adjusted chrominance value and the initial chrominance value of the first pixel according to the second weight.

15. The image processing method as claimed in claim 14, wherein the second weight is positively correlated with at least one of the luminance difference and the chrominance difference.

16. The image processing method as claimed in claim 14, further comprising:
  determining a saturation parameter according to a difference between the initial chrominance value of the first pixel and a second predetermined chrominance value;
  determining a third weight according to the saturation parameter; and
  generating a third adjusted chrominance value by weighted calculating the second adjusted chrominance value and the initial chrominance value of the first pixel.

17. The image processing method as claimed in claim 16, wherein the third weight is positively correlated with the saturation parameter.

* * * * *